United States Patent [19]

Lamond

[11] Patent Number: 5,023,988

[45] Date of Patent: Jun. 18, 1991

[54] METHOD FOR REMOVING A BOWLING BALL FINGERTIP INSERT FROM A BOWLING BALL FINGER HOLE

[76] Inventor: Thomas W. Lamond, 1647 S. 27th St., Philadelphia, Pa. 19145

[21] Appl. No.: 617,414

[22] Filed: Nov. 19, 1990

Related U.S. Application Data

[62] Division of Ser. No. 918,347, Oct. 4, 1986, abandoned.

[51] Int. Cl.[5] .......... B23P 19/00; B26B 3/00

[52] U.S. Cl. .......... 29/426.1; 29/426.4; 30/169

[58] Field of Search .......... 29/426.1, 426.2, 426.3, 29/426.4, 426.5, 426.6; 30/113.1, 169, 174; 273/63 R, 63 A, 63 B; 15/236.1, 104.011, 104.03, 104.05, 104.15, 104.14

[56] References Cited

U.S. PATENT DOCUMENTS

| | | | |
|---|---|---|---|
| 493,290 | 3/1893 | Poor et al. | 30/169 X |
| 1,080,307 | 12/1913 | Sondheimer | 273/63 B |
| 1,551,815 | 9/1925 | Ferguson | 30/113.1 |
| 2,460,385 | 2/1949 | Hausman | 273/63 B |
| 2,719,995 | 10/1955 | Hohenstein | 30/169 X |
| 3,508,321 | 4/1970 | Wood | 29/426.4 |
| 4,307,983 | 12/1981 | Blough et al. | 29/426.4 X |

FOREIGN PATENT DOCUMENTS

| | | | |
|---|---|---|---|
| 434599 | 10/1967 | Switzerland | 30/113.1 |

*Primary Examiner*—Douglas D. Watts
*Attorney, Agent, or Firm*—Ratner & Prestia

[57] ABSTRACT

A method of using a bowling ball fingertip insert removal tool which has a bladed section adapted to cut through the adhesive joint between a fingertip insert and the finger hole in the bowling ball and preserve the integrity of the fingertip insert. The bladed section is grooved and has a one-inch outside diameter coresponding to the diameter of a bowling ball finger hole. The edges of the bladed section are sharpened and merge into a point. The tool is first moved along the axis of the bowling ball finger hole to break the adhesive joint and is then turned about its axis to cut through the remainder of the adhesive joint.

20 Claims, 1 Drawing Sheet

FIG. 1
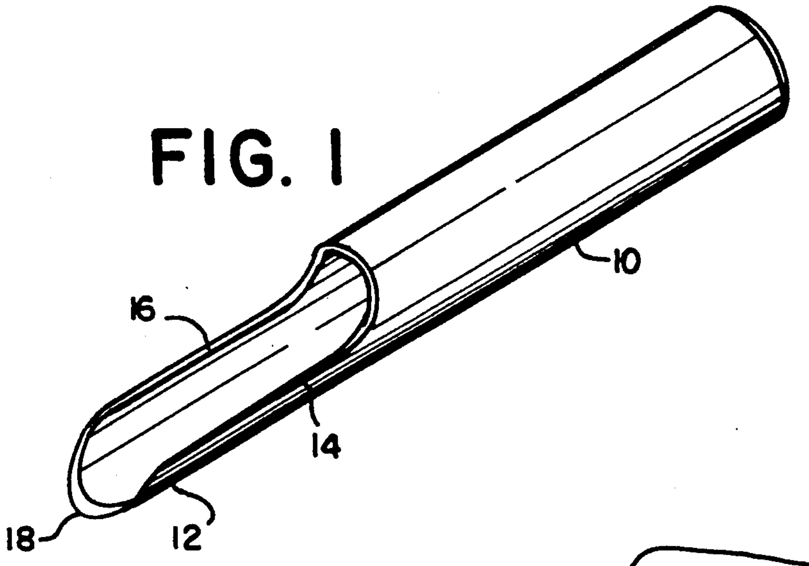
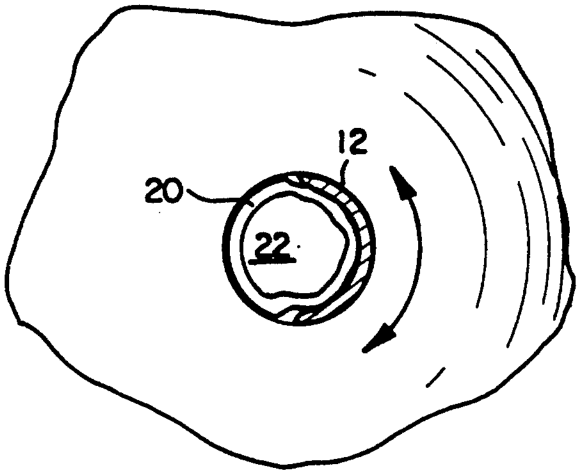
FIG. 3
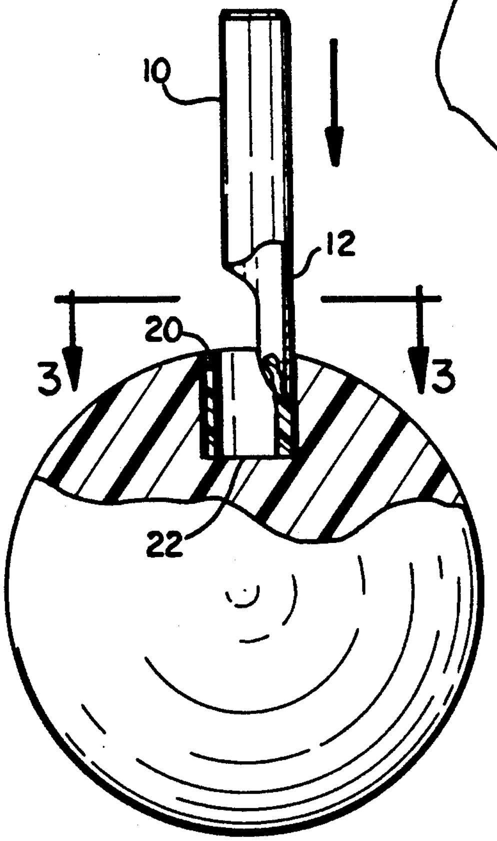
FIG. 2

METHOD FOR REMOVING A BOWLING BALL FINGERTIP INSERT FROM A BOWLING BALL FINGER HOLE

This application is a division of application Ser. No. 06/918,347 filed Oct. 14, 1986, now abandoned.

TECHNICAL FIELD

The present invention relates, in general, to tools for removing inserts and, in particular, to a method for removing fingertip inserts from the finger holes of bowling balls.

BACKGROUND ART

Serious bowlers regularly change the inserts they use in the finger holes in their bowling balls as the size of their fingers changes. Finger size changes with varying temperature and humidity conditions and as the physiology of the bowler changes.

The regulations of the American Bowling Congress require bowlers, competing in tournaments with bowling balls having fingertip inserts, to secure the insert with an adhesive. Present techniques for removing fingertip inserts result in the inserts being destroyed because of the resistance of the adhesive to removal of the insert. Typically, a screw driver or other bladed tool is used to pry or scrap as much of the insert as possible out of the finger hole. If necessary, an abrasive material is used to remove any residue.

U.S. Pat. Nos. 2,475,876 and 3,129,002 describe special fingertip inserts for bowling balls and tools for removing these inserts. Each of these inserts requires special preparation of the finger holes into which the inserts are inserted. The insert in U.S. Pat. No. 2,475,876 requires an internal thread in the finger hole, while the insert in U.S. Pat. No. 3,129,002 requires a counterbore at the lower portion of the finger hole. Providing an internal thread or a counterbore in the finger hole can be difficult and adds expense to the hole preparation. In addition, the inserts must be shaped correspondingly adding expense to their fabrication.

Moreover, the insertion of the inserts of the aforementioned patents without an adhesive does not satisfy the regulations of the American Bowling Congress. When as adhesive is used to secure these inserts, the inserts will be destroyed when they are removed with the tools shown in these patents.

DISCLOSURE OF THE INVENTION

A bowling ball fingertip insert removal tool, constructed and used in accordance with the present invention, includes a handle and a grooved blade extending away from the handle. The blade has a pair of sharpened edges which extend along the length of the blade and merge into a point at the free end of the blade. The blade has a one-inch outside diameter corresponding to the diameter of a finger hole in a bowling ball. Preferably, the tool is an integral unit formed from a piece of tubular cylindrical metal.

BRIEF DESCRIPTION OF THE DRAWING

Referring to the drawing:

FIG. 1 is a perspective view of a bowling ball fingertip insert removal tool constructed and used in accordance with the present invention;

FIG. 2, partially in section, shows the tool of FIG. 1 as it is being inserted into a bowling ball finger hole to remove a fingertip insert; and FIG. 3 is a sectional view taken along line 3—3 of FIG. 2.

BEST MODE FOR CARRYING OUT THE INVENTION

Referring to the drawing, a bowling ball fingertip insert removal tool, constructed and used in accordance with the present invention, includes a handle 10 and a grooved blade 12 which extends away from the handle. Blade 12 has a pair of sharpened, parallel edges 14 and 16 which extend along the length of the blade and merge into a point 18 at the free end of the blade. When formed from a piece of tubular cylindrical metal, handle 10 and blade 12 are an integral unit with the blade being an extension of the handle. This is accomplished by cutting away a portion of the metal along a selected length, over a selected arc length, to provide two edges which define the grooved blade and extend parallel to the axis of the handle. Then, these edges are sharpened.

Blade 12 has an outside diameter of one inch which corresponds to the diameter of a bowling ball finger hole. The length of the blade preferably is approximately two and one-half inches to accommodate the usual depths of finger holes in bowling balls. The length of handle 10 preferably is three and one-half inches to provide adequate length for the tool to be gripped. If desired, handle 10 can be knurled or wrapped with a tape or other suitable material to enhance gripping.

To remove an insert 20 in a bowling ball finger hole 22, blade 12 is inserted into the finger hole by moving it along the axis of the finger hole in the direction of the arrow shown in FIG. 2. This breaks the adhesive joint between insert 20 and the wall of the finger hole. FIG. 3 shows blade 12 in the finger hole.

After blade 12 has been inserted into hole 22, the tool is turned about its axis to break the remainder of the adhesive joint. With both edges 14 and 16 sharpened, the tool may be turned in either direction as indicated by the arrow in FIG. 3.

The thickness of blade 12 preferably is approximately one-eighth of an inch. This provides adequate strength to the blade while being thin enough for relatively easy insertion of the blade between insert 20 and finger hole 22.

The foregoing has set forth an exemplary and preferred embodiment of the present invention. It will be understood, however, that various alternatives will occur to those of ordinary skill in the art without departure from the spirit and scope of the present invention.

I claim:

1. A method for removing a bowling ball fingertip insert from a bowling ball finger hole in which said insert is secured by an adhesive joint between said insert and said finger hole, said method comprising the steps of:

providing a tool having:
- (a) a handle, and
- (b) a grooved blade extending away from said handle and having (i) a pair of sharpened edges extending along the length of said blade merging into a point at the free end of said blade and (ii) an outside diameter equal to the diameter of said bowling ball finger hole;

breaking partially said adhesive joint between said fingertip insert and said bowling ball finger hole by inserting said blade into said finger hole between said insert and said finger hole;

breaking the remainder of said adhesive joint between said fingertip insert and said bowling ball finger hole by turning said tool about its axis while said blade is between said insert and said finger hole;

removing said blade from said bowling ball finger hole; and removing said fingertip insert intact from said bowling ball finger hole.

2. A method for removing a bowling ball fingertip insert from a bowling ball finger hole in which said insert is secured by an adhesive joint between said insert and said finger hole, said method comprising the steps of:

providing a tool having;

(a) a handle, and (b) a grooved blade extending away from said handle and having (i) a pair of sharpened edges extending along the length of said blade merging into a point at the free end of said blade and (ii) an outside diameter equal to the diameter of said bowling ball finger hole;

inserting said blade into said bowling ball finger hole between said fingertip insert and said finger hole to partially break said adhesive joint between said insert and said finger hole;

turning said tool about its axis to break the remainder of said adhesive joint between said fingertip insert and said bowling ball finger hole;

removing said blade from said bowling ball finger hole; and removing said fingertip insert intact from said bowling ball finger hole.

3. A method of using a bowling ball fingertip inert removal tool including:

(a) a handle, and (b) a grooved blade extending away from said handle having (i) a pair of sharpened edges extending along the length of said blade merging into a point at the free end of said blade, and (ii) an outside diameter equal to the diameter of said bowling ball finger hole to remove a fingertip insert from a bowling ball finger hole in which said insert is secured by an adhesive joint between said insert and said finger hole, said method comprising the steps of:

(a) breaking partially said adhesive joint between the insert and said finger hole by inserting said blade into said fingertip hole between said insert and said fingertip hole;

(b) breaking the remainder of adhesive joint by turning said tool about its axis;

(c) removing said blade from said finger hole; and (d) removing said fingerstip insert intact from said fingertip hole.

4. A method of using a bowling ball fingertip insert removal tool including:

(a) a handle, and (b) a grooved blade extending away from said handle having (i) a pair of sharpened edges extending along the length of said blade merging into a point at the free end of said blade, and (ii) an outside diameter equal to the diameter of said bowling ball finger hole to remove a fingertip insert from a bowling ball finger hole in which said insert is secured by an adhesive joint between said insert and said finger hole, said method comprising the steps of:

(a) grasping said handle of said tool;

(b) pointing said point of said blade of said tool toward said bowling ball finger hole;

(c) aligning said blade of said tool along the axis of said bowling ball finger hole;

(d) breaking partially said adhesive joint between the finger tip insert and said bowling ball finger hole by inserting said blade of said tool into said fingertip hole between said insert and said fingertip hole;

(e) breaking the remainder of said adhesive joint by turning said tool about its axis;

(f) removing said blade from said bowling ball finger hole; and (g) removing said fingerstip insert intact from said bowling ball finger hole.

5. A method according to claim 1 wherein said outside diameter of said blade of said tool is one inch.

6. A method according to claim 2 wherein said outside diameter of said blade of said tool is one inch.

7. A method according to claim 3 wherein said outside diameter of said blade of said tool is one inch.

8. A method according to claim 4 wherein said outside diameter of said blade of said tool is one inch.

9. A method according to claim 5 wherein said edges of said blade of said tool are parallel.

10. A method according to claim 6 wherein said edges of said blade of said tool are parallel.

11. A method according to claim 7 wherein said edges of said blade of said tool are parallel.

12. A method according to claim 8 wherein said edges of said blade of said tool are parallel.

13. A method according to claim 9 wherein said blade of said tool has a thickness of approximately one-eigth of an inch.

14. A method according to claim 10 wherein said blade of said tool has a thickness of approximately one-eigth of an inch.

15. A method according to claim 11 wherein said blade of said tool has a thickness of approximately one-eigth of an inch.

16. A method according to claim 12 wherein said blade of said tool has a thickness of approximately one-eigth of an inch.

17. A method according to claim 13 wherein said blade of said tool has a length of approximately two and one-half inches.

18. A method according to claim 14 wherein said blade of said tool has a length of approximately two and one-half inches.

19. A method according to claim 15 wherein said blade of said tool has a length of approximately two and one-half inches.

20. A method according to claim 16 wherein said blade of said tool has a length of approximately two and one-half inches.

* * * * *

UNITED STATES PATENT AND TRADEMARK OFFICE
CERTIFICATE OF CORRECTION

PATENT NO. : 5,023,988

DATED : June 18, 1991

INVENTOR(S) : Thomas W. Lamond

It is certified that error appears in the above—identified patent and that said Letters Patent is hereby corrected as shown below:

Title page, item (62) - Change "Oct.4, 1986" to --Oct.14, 1986--.

Title page, item (56) - Add --959,450 5/1910 Bridgeman-- to References Cited. (This reference was cited in an Information Disclosure Statement submitted to the Commissioner of Patents and Trademarks on December 2, 1986.)

Title page, item (56) - Under References Cited, Change "2,460,385 2/1949 Hausman" to --2,460,385 2/1944 Hausman--.

Signed and Sealed this

Thirteenth Day of April, 1993

*Attest:*

STEPHEN G. KUNIN

*Attesting Officer*

*Acting Commissioner of Patents and Trademarks*